US008868311B2

(12) United States Patent
Schwindt

(10) Patent No.: US 8,868,311 B2
(45) Date of Patent: Oct. 21, 2014

(54) METHOD TO DEAL WITH SLOW INITIAL BRAKE RESPONSE FOR ADAPTIVE CRUISE CONTROL

(71) Applicant: Robert Bosch GmbH, Stuttgart (DE)

(72) Inventor: Oliver F. Schwindt, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 13/835,047

(22) Filed: Mar. 15, 2013

(65) Prior Publication Data

US 2014/0100755 A1 Apr. 10, 2014

Related U.S. Application Data

(60) Provisional application No. 61/709,675, filed on Oct. 4, 2012.

(51) Int. Cl.
*B60T 8/48* (2006.01)
*B60W 30/16* (2012.01)

(52) U.S. Cl.
USPC .............................. 701/93; 701/301; 340/903

(58) Field of Classification Search
USPC .................. 701/93, 96, 78, 83, 301; 340/903
See application file for complete search history.

(56) References Cited

U.S. PATENT DOCUMENTS

| 6,304,808 | B1 | 10/2001 | Milot |
| 6,374,174 | B2 | 4/2002 | Hellmann et al. |
| 6,385,527 | B1 | 5/2002 | Zumberge et al. |
| 6,675,086 | B2 | 1/2004 | Hellmann et al. |
| 7,011,379 | B2 | 3/2006 | Rader et al. |
| 7,401,868 | B2 | 7/2008 | Steen et al. |
| 8,078,382 | B2 * | 12/2011 | Sugano et al. ................ 701/96 |
| 8,095,286 | B2 | 1/2012 | Wolfgang et al. |
| 8,170,770 | B2 | 5/2012 | Grolle |
| 2011/0272228 | A1 | 11/2011 | Kunz et al. |
| 2012/0191318 | A1 | 7/2012 | Holzmann et al. |
| 2012/0203399 | A1 * | 8/2012 | Filev et al. ...................... 701/1 |
| 2013/0304344 | A1 * | 11/2013 | Abe ............................... 701/70 |

FOREIGN PATENT DOCUMENTS

| DE | 10118707 | 10/2002 |
| DE | 10325266 | 1/2004 |
| EP | 1081004 | 3/2001 |
| WO | 2009158223 | 12/2009 |

OTHER PUBLICATIONS

International Search Report and Written Opinion for Application No. PCT/US2013/063368 dated Jan. 3, 2014 (9 pages).

* cited by examiner

*Primary Examiner* — Tan Q Nguyen
(74) *Attorney, Agent, or Firm* — Michael Best & Friedrich LLP

(57) ABSTRACT

A method of controlling braking in an adaptive cruise control (ACC) of a vehicle. The method includes determining that braking is needed, including determining an amount of braking force needed, providing an indication to the brake system that braking is needed, filling the brake system with brake fluid at a predetermined rate to reduce pump noise, setting a delay equal to the amount of time needed to fill the brake system with fluid, applying a brake pad to a brake disc at the amount of braking force needed after waiting the delay, comparing the amount of braking force needed to the amount of braking force actually occurring, and reducing the delay to zero when the amount of braking force needed is less than or equal to the amount of braking force actually occurring.

10 Claims, 3 Drawing Sheets

METHOD TO DEAL WITH SLOW INITIAL BRAKE RESPONSE FOR ADAPTIVE CRUISE CONTROL

RELATED APPLICATION

The present patent application claims the benefit of prior filed U.S. Provisional Patent Application No. 61/709,675, filed on Oct. 4, 2012, the entire content of which is hereby incorporated by reference.

BACKGROUND

The present invention relates to an adaptive cruise control (ACC), specifically improving braking response when the adaptive cruise control requests braking.

Some ACCs use an electronic stability program (ESP) system to execute braking. Because the brake pads need to contact the brake disks before any braking can occur, the initial brake deceleration following a request from the ACC takes a relatively long time to execute (e.g., a delay of 200 to 500 milliseconds before a deceleration really occurs), and causes a large volume of brake fluid to be pumped. Other than limitations of how fast the pump can run, there is usually an unacceptable noise (a noise/vibration/harshness (NVH) issue) that occurs when running the pump very fast.

Thereafter, (a) either the ACC brake deceleration request catches up, or (b) the delay is kept constant throughout the entire control. The advantages of point (a) is that after the request has caught up, there are no more 'late' reactions due to delays, and there are less problems with oscillations that are caused by delays in reactions. The disadvantage, however, is that when catching up to the request, a jerk (rate-of-change of acceleration) that the ESP system executes is greater than the ACC demands. This jerk can be felt by the driver, and is higher on the initial braking than on subsequent reactions. Furthermore, since the jerk is higher, it may also be associated with more noise than necessary (an undesirable element of NVH). The advantage of (b) is that the jerk requested by the ACC is executed as the ACC requested, and therefore 'feels' right. However, this method reacts as late as the initial delay, and is susceptible to oscillations in the system (unless a significant effort is made to tune the systems to be in-line with each other).

The described effects apply to ACC and also other types of longitudinal control used for comfort functions. In addition, in the future the effects would also apply to autonomous driving.

SUMMARY

In one embodiment, the invention provides a method of controlling braking in an adaptive cruise control (ACC) of a vehicle. The method includes determining that braking is needed, including determining an amount of braking force needed, providing an indication to the brake system that braking is needed, filling the brake system with brake fluid at a predetermined rate to reduce pump noise, setting a delay equal to the amount of time needed to fill the brake system with fluid, applying a brake pad to a brake disc at the amount of braking force needed after waiting the delay, comparing the amount of braking force needed to the amount of braking force actually occurring, and reducing the delay to zero when the amount of braking force needed is less than or equal to the amount of braking force actually occurring.

In another embodiment the invention provides a vehicle. The vehicle includes a brake system and an adaptive cruise control (ACC). The ACC is configured to determine that braking is needed, including an amount of braking force needed, provide an indication to the brake system that braking is needed, fill the brake system with brake fluid at a predetermined rate that is a slower rate than the brake system normally pumps the brake fluid in order to reduce pump, set a delay equal to the amount of time needed to fill the brake system with fluid such that the brake system has enough fluid for a brake pad to contact a brake disc, apply the brake force at the amount needed after waiting the delay, compare the amount of braking force needed to the amount of brake force actually occurring, and reduce the delay to zero when the amount of brake force needed is less than or equal to the amount of brake force actually occurring.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one embodiment, the invention provides a method of generating a braking command or "jerk," beyond that requested by an ACC, for catching up an ACC brake deceleration. The method reduces or eliminates the initial delay-time during braking operation. In addition, a linearly decreasing delay time to abolish the initial delay is not used under all circumstances. Instead, a number of concepts are combined, using the constant-delay method initially, and then shortening the delay to as low as possible. Transferring from a long constant-delay to a short constant delay provides improved performance.

Figure 1:
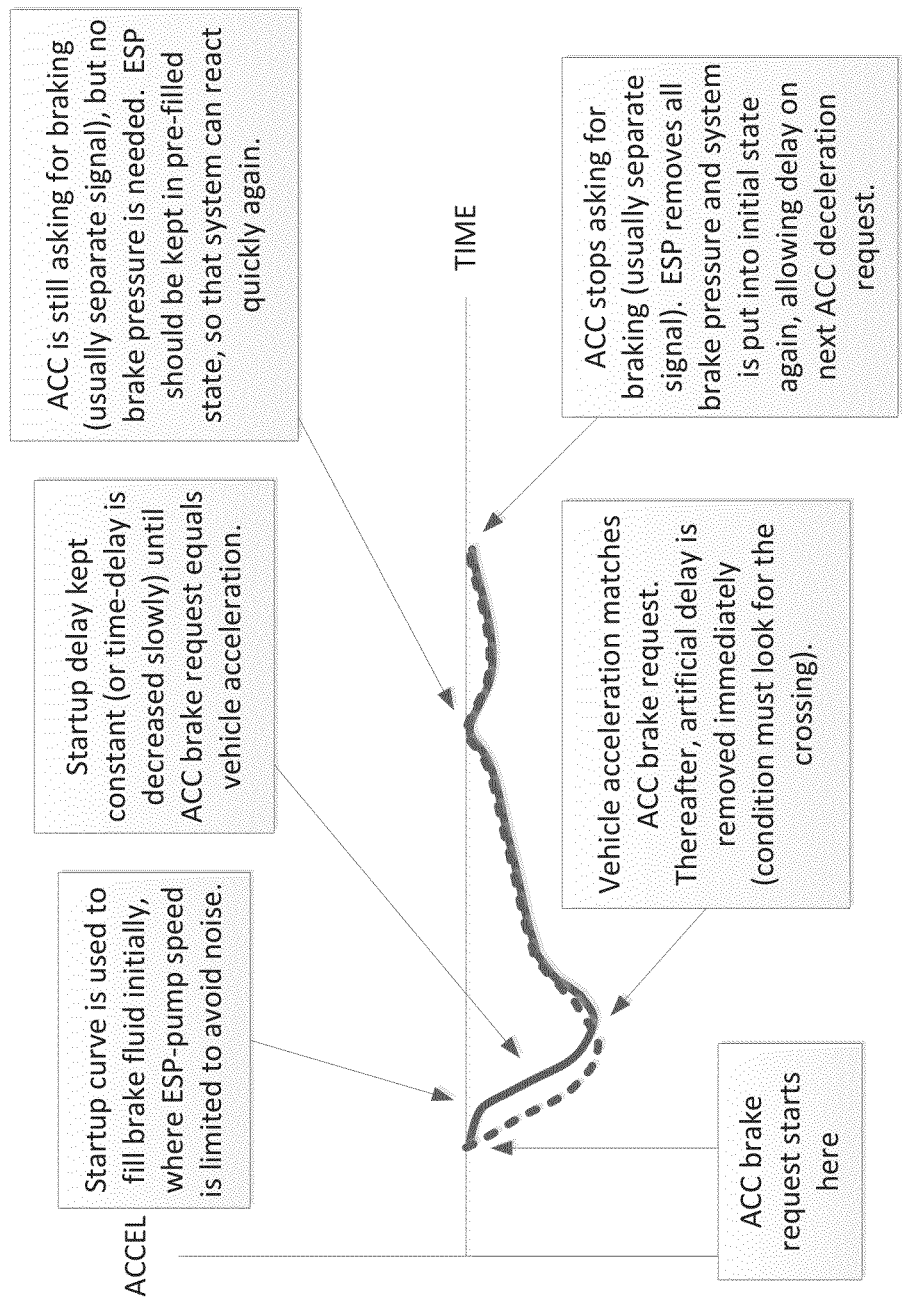
FIG. 1 is a graph of an ACC brake request versus actual braking.

FIG. 1 shows a graph of the operation of the invention. After an ACC brake deceleration request is received by the ESP, the ESP system pumps a large amount of brake fluid. There is little or no reaction until the brake pads are touching the brake disks. Thereafter, the ESP system follows the ACC brake deceleration request, but with the delay of the initial startup time. This is continued, until the current deceleration and the ACC requested deceleration match up (in practice, the crossing of current and requested deceleration must be determined). At this point, an 'equilibrium' has been reached (even if the request crosses the current state, without being in a steady state), and the artificial delay time, caused by the startup time, is immediately set to zero. Thereafter, the ESP system reacts as fast as it can. This continues until no more braking is requested by the ACC system. In addition, even if no brake pressure is needed to apply the brake deceleration requested by the ACC, the ESP system continues to have a minimal amount of fluid in the system. This allows a subsequent braking request from the ACC to be executed as quickly as possible as a result of the fluid maintained in the brake system eliminating the start-up delay. This can occur in slow traffic or downhill situations. When the ACC communicates that it is no longer requesting ESP cause a deceleration (e.g., by a separate flag), the ESP removes the minimal fluid from the brake system.

In some embodiments, catching up of the ACC brake deceleration request is performed. In one embodiment, the jerk is executed to an accuracy of 10% (i.e., jerk is applied at 90-110% of requested jerk). Therefore, if the initial delay is 300 milliseconds, the artificial delay is linearly reduced to near zero over 3 seconds (e.g., 10% every 300 msec). When the vehicle acceleration matches the ACC brake deceleration request, the delay jumps to zero. This method of catching up results in relatively smaller jerks, with the deceleration getting larger continuously over a longer period of time.

In some embodiments, a startup curve is used to reduce pump noise (e.g., a fixed profile is used initially). However, since a constant time does not need to be held for all requests, it may be advantageous to make the startup curve dependent on the jerk of the initial ACC request. The higher the jerk requested, the smaller the delay time is. Therefore, on a request for maximal jerk, a 200 to 300 millisecond delay is used. On a request for a small jerk, a 300 to 500 millisecond delay is used.

The invention is particularly useful for a low-end ESP unit (in particular 2-piston pump systems) and for heavy vehicles, where a large volume of brake fluid needs to be pumped. However, the invention has application for all types of ESP units.

Figure 2:
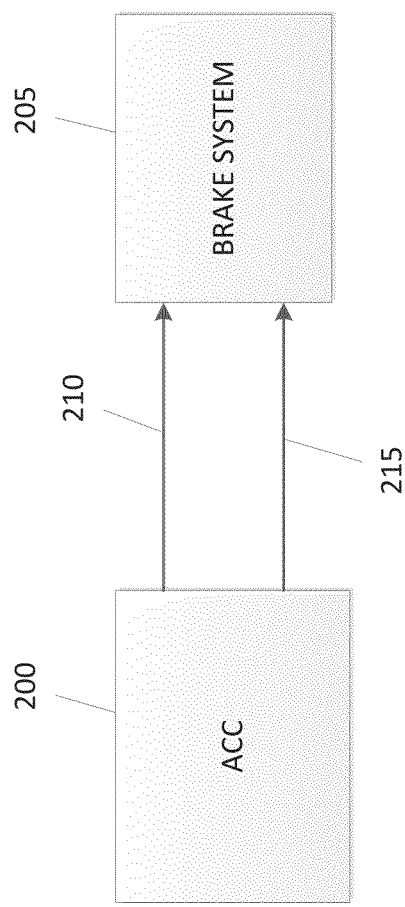
FIG. 2 is a block diagram of an ACC system interacting with a brake system.

FIG. 2 shows a block diagram of an ACC 200 interfacing with a brake system 205 of a vehicle. The ACC 200 provides an indication, via line 210, to the brake system 205 that braking is needed. The ACC 200 also provides an indication, via line 215, to the brake system 205 of the amount of braking that is needed. When the ACC 200 is in a braking mode (e.g., when following a target vehicle), the ACC 200 provides the indication on line 210 to the brake system 205. If the host vehicle needs to slow down (e.g., because the target vehicle is moving slower than the host vehicle), the ACC 200 also provides an indication on line 215 of the amount of braking necessary. If the host vehicle is following a target vehicle, but the target vehicle is moving faster or at the same speed as the host vehicle, the ACC 200 provides an indication via line 215 that the amount of braking necessary is zero; however, because the host vehicle is still following the target vehicle, the ACC 200 maintains the indication of braking on line 210.

Figure 3:
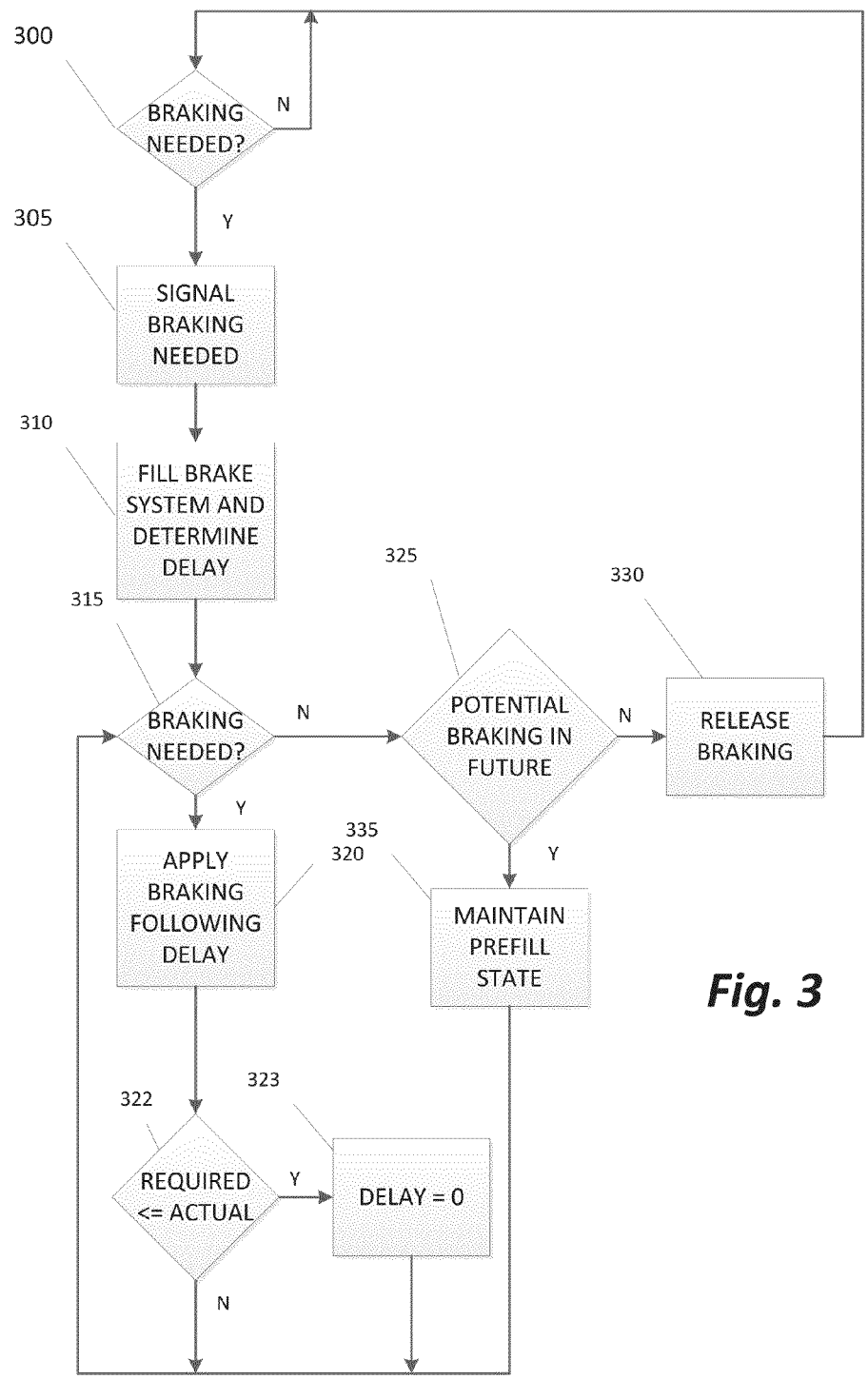
FIG. 3 is a flow chart of an operation of the systems of FIG. 2.

FIG. 3 shows the operation of the ACC 200. When the ACC 200 is first engaged, the ACC 200 determines if braking is needed (e.g., when following a target vehicle) (step 300). If the vehicle does not need to engage the brake system 205 (e.g., there are no objects ahead of the host vehicle) the ACC 200 continues to check (e.g., at a timed interval) if braking is needed (step 300). If braking is needed (e.g., a target vehicle that the host vehicle is following is identified), the ACC 200 sends an indication to the brake system 205 (via line 210) that a braking condition is occurring (step 305). The ACC 200 then waits as the brake system 205 fills with brake fluid, and determines an amount of time needed for the brake system 205 to fill (step 310). The brake system 205 fills at a rate that reduces or eliminates pump noise. The ACC 200 continues to check if braking is needed (step 315). If the host vehicle needs to be slowed, the ACC 200 (via line 215), after delaying the delay time, applies the needed braking (step 320). The ACC 200 then compares the actual amount of braking to the required braking (without the delay) (step 322). If the actual and required braking are equal (or the required braking is less than the actual braking), the ACC 200 sets the delay to zero (step 323). Once the delay is set to zero, the brake system 205 reacts as soon as the ACC 200 needs braking. The operation then loops back (e.g., at a time interval) to step 315 to continue checking if braking is needed.

If the host vehicle did not need to slow down at step 315, the ACC 200 determines if a potential braking event may occur in the future (e.g., the host vehicle is still following the target vehicle) (step 325). If a potential braking event no longer exists (e.g., the target vehicle turned off), the ACC 200 releases the braking system 205 by removing the braking indications from lines 210 and 215 (step 330). This causes the brake fluid to no longer be maintained in the brake system 205. However, if a potential braking event is still likely (e.g., the host vehicle is still following the target vehicle), the ACC 200 maintains the prefill state of the braking system 205 by setting the indication of the amount of braking to zero (line 215) and maintaining the indication of braking on line 210 (step 335) and loops back to checking if braking is needed (step 315).

Thus, the invention provides, among other things, a method of controlling braking in an ACC.

What is claimed is:

1. A method of controlling braking in an adaptive cruise control (ACC) of a vehicle, the vehicle having a braking system including a brake having a brake pad and a brake disc, the method comprising:
   determining that braking is needed, including determining an amount of braking force needed;
   providing an indication to the brake system that braking is needed;
   filling the brake system with brake fluid at a predetermined rate that is a slower rate than the brake system normally pumps the brake fluid in order to reduce pump noise;
   setting a delay equal to the amount of time needed to fill the brake system with fluid such that the brake system has enough fluid for the brake pad to contact the brake disc;
   applying the brake pad to the brake disc at the amount of braking force needed after waiting the delay;
   comparing the amount of braking force needed to the amount of braking force actually occurring; and
   reducing the delay to zero when the amount of braking force needed is less than or equal to the amount of braking force actually occurring.

2. The method of claim 1, further comprising determining braking force is not needed and an object is ahead of the vehicle and maintaining a filled state in the brake system.

3. The method of claim 1, further comprising determining braking force is not needed and an object is not ahead of the vehicle and releasing the brake system.

4. The method of claim 1, wherein the indication that braking is needed includes a first indication for braking being needed and a second indication of the amount of braking force needed.

5. The method of claim 1, wherein after the delay is set to zero, the brake pad substantially immediately contacts the brake disc with a force equal to the force requested by the ACC.

6. A vehicle comprising:
   a brake system; and
   an adaptive cruise control configured to
      determine that braking is needed, including an amount of braking force needed;
      provide an indication to the brake system that braking is needed;
      fill the brake system with brake fluid at a predetermined rate that is a slower rate than the brake system normally pumps the brake fluid in order to reduce pump;

set a delay equal to the amount of time needed to fill the brake system with fluid such that the brake system has enough fluid for a brake pad to contact a brake disc;

apply the brake force at the amount needed after waiting the delay;

compare the amount of braking force needed to the amount of brake force actually occurring; and reduce the delay to zero when the amount of brake force needed is less than or equal to the amount of brake force actually occurring.

7. The vehicle of claim 6, wherein the ACC is configured to maintain a filled state in the brake system when the ACC determines that braking is not needed and an object is ahead of the vehicle.

8. The vehicle of claim 6, wherein the ACC is configured to release the brake when the ACC determines that brake force is not needed and an object is not ahead of the vehicle.

9. The vehicle of claim 6, wherein the indication that braking is needed includes a first indication that braking is needed and a second indication of the amount of brake force needed.

10. The vehicle of claim 6, wherein after the delay is set to zero, the brake pad substantially immediately contacts the brake disc with a force requested by the ACC.

* * * * *